E. B. MOORE.
FLASH LIGHT FOR PHOTOGRAPHIC USE.
APPLICATION FILED JAN. 5, 1907.
902,430.
Patented Oct. 27, 1908.
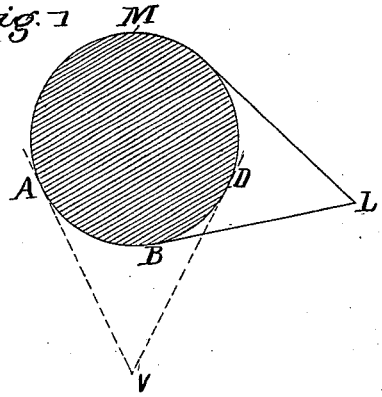
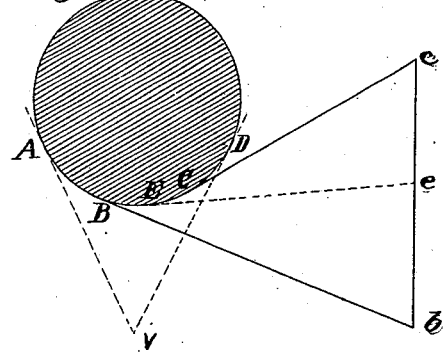
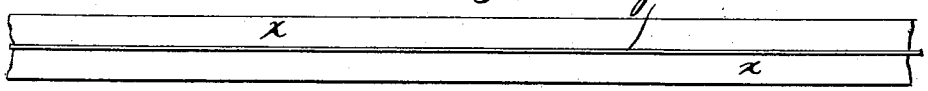
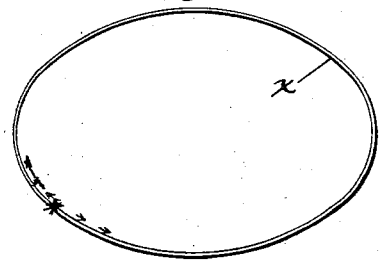
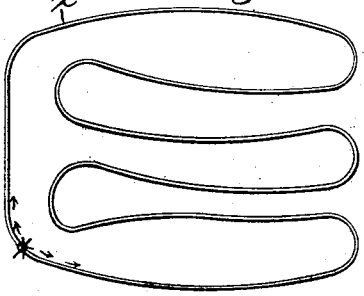
WITNESSES
INVENTOR
EDGAR B. MOORE
BY
ATTORNEYS

UNITED STATES PATENT OFFICE.

EDGAR BLACKBURN MOORE, OF LOS ANGELES, CALIFORNIA.

FLASH-LIGHT FOR PHOTOGRAPHIC USE.

No. 902,430.       Specification of Letters Patent.       Patented Oct. 27, 1908.

Application filed January 5, 1907. Serial No. 350,950.

*To all whom it may concern:*

Be it known that I, EDGAR BLACKBURN MOORE, a citizen of the United States, residing at Los Angeles, in the county of Los Angeles and State of California, have invented a new and useful Improvement in Flash-Lights for Photographic Use, of which the following is a specification.

The object of my invention is to produce an artificial flash-light for photographic use that will give a soft lighting effect, such as that produced by a skylight in a studio and also to produce lighting effects, such as stage lighting, artificial studio lighting, etc., with a more pleasing effect by means of the soft light produced.

With proper source of illumination a solid object, a sphere for instance, has an extreme highlight, then as the angle of the surface of the sphere changes with respect to the source of light, the highlight gradually changes to the middle-tones, then to the deep shadows, there being no sudden change of tone. This is the effect produced by a skylight.

By a concentrated (improper) source of illumination the object has one even highlight, then after a certain angle this suddenly drops to a dark shadow, there being no middle-tones but two tones with a hard line between them. This is the harsh effect produced by an arc-light or common flash-light in which the light emanates from a concentrated point.

In my invention the soft effects in lighting are produced by the source of illumination having a relatively large area and it consists in the novel means for producing and disseminating such light as hereinafter fully described.

Figures 1 and 2 are diagrams illustrating both the improper and proper methods of illumination. Figs. 3 and 4 are views of an explosive tape for carrying out the principles of my invention, along the lines of the illumination given in Fig. 2, Fig. 4 being a cross section of Fig. 3. Figs. 5 and 6 illustrate the disposition of the tape for carrying out my invention.

Referring to Fig. 1; in illustrating an improper method of illumination, M is a section of sphere illuminated by a point of light L, and V is the observation point. A, B, represent a deep shadow, and B, D, an extreme highlight. There are no middle tones, but an abrupt line at B.

N is a section of sphere illuminated by a light with large area b, e, c and V the observation point, as in Fig. 1.

In Fig. 2 A, B, is a deep shadow, B, C, the middle tones and C, D the high-light.

It will be seen from above that the intensity of the light on a given point on the object is proportioned to the area of the source of illumination which is visible from that point. C, D, in Fig. 2, receives light from c to b and is the high-light; E, B, receive light from e to b only and is a middle tone while A, B, receives no light. Therefore the area of the source of illumination being large, the intensity of light on any given point on the object is a function of the angle which the surface of the solid at this point makes with the source of light, this being the factor which produces the appearance of solidity in so far as light and shade are concerned.

The fundamental principle of my invention is the placing of the flash or light preparation or artificial light over relatively large area, with the view of imitating a studio skylight as regards area, thus producing a soft light. In the practical application of this principle it is not necessary to cover the whole of said area with the flash preparation or artificial light, but only to have the preparation arranged around the border of area or over more or less numerous points or lines of same, this being the more convenient application, the soft lighting effect being the same.

In carrying out my invention I employ a fuse or tape as seen at $x$ in Fig. 3 composed of a rapidly combustible substance in combination with light giving ingredients to act on a photographic plate. A non-combustible binder $z$ of wire, or other material runs the length of the tape as seen in Figs. 3 and 4 to give rigidity before and during the combustion. This flash tape is to be arranged over large areas (the whole side of room for instance) or around borders of same, ignition being at such a point so that the tape will burn two or more ways simultaneously to insure quick combustion as shown in Figs. 5 or 6.

The tape or cord is prepared of gun cotton having magnesium powder intimately mixed in the fibers and with the metallic wire for a support.

The non combustible wire $y$ in the tape gives tensile strength enough to the tape to allow it to be suspended upon a series of supporting points around the room and remain thus suspended in position while burning. It also prevents the tape from accidental severance and thus maintains its continuity of burning.

The tape is made in attenuated lengths of indefinitely extended continuity capable of circuitous or tortuous disposition along one side of the entire room, as shown in Figs. 5 and 6, and thus carrying out the optical results illustrated in Fig. 2.

I claim.

A flash-light, consisting of a quick burning and light giving composition constructed in the form of an attenuated and indefinitely extended fuse having incorporated along the length of the same a continuous and non combustible binder.

EDGAR BLACKBURN MOORE.

Witnesses:
WM. H. BROWN,
CHARLES LANTZ.